July 26, 1966　　　　　L. B. VENO, JR　　　　　3,262,645
THRUST VECTORING AND MODULATING APPARATUS
Filed Dec. 30, 1963　　　　　　　　　　　　　　2 Sheets-Sheet 1
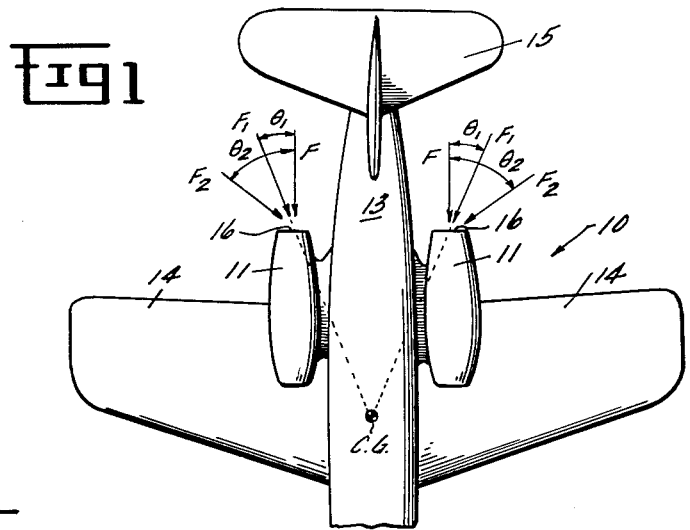
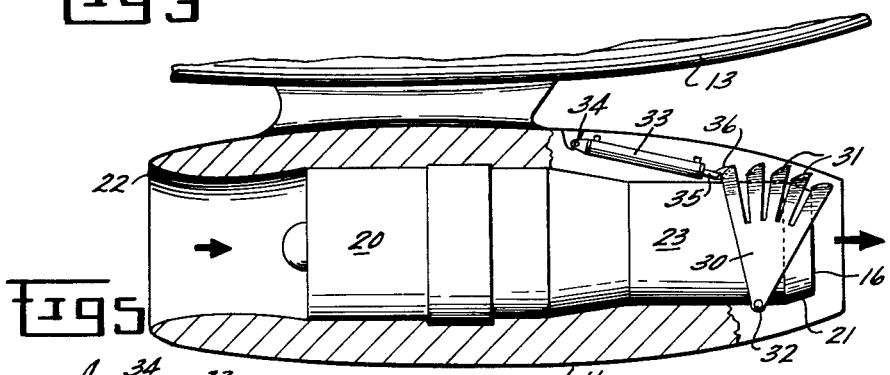
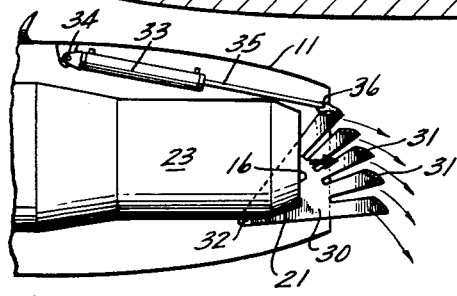
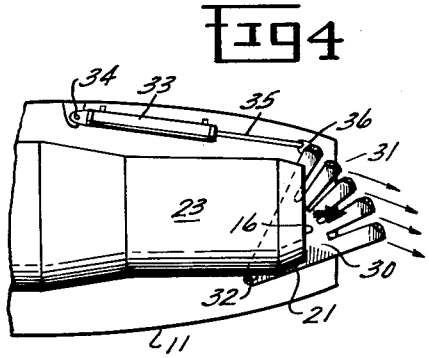
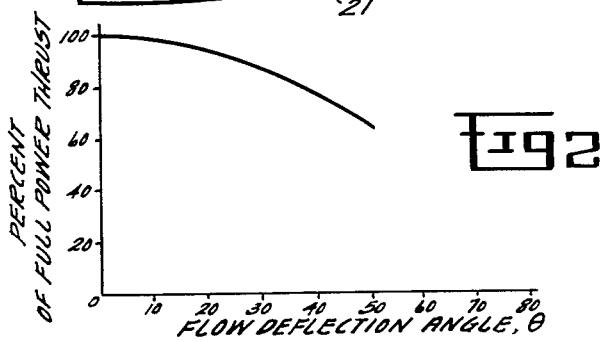
INVENTOR.
LESTER B. VENO, JR.
BY
George R. Powers
ATTORNEY—

United States Patent Office 3,262,645
Patented July 26, 1966

3,262,645
THRUST VECTORING AND MODULATING
APPARATUS
Lester Bernard Veno, Jr., East Weymouth, Mass., assignor to General Electric Company, a corporation of New York
Filed Dec. 30, 1963, Ser. No. 334,479
4 Claims. (Cl. 239—265.19)

This invention relates to thrust vectoring and modulating apparatus and, more particularly, to aircraft apparatus for turning or deflecting exhaust gases issuing from jet propulsion engines to reduce the effective forward thrust without reducing the total engine power output.

During the landing approach of high speed, jet propelled aircraft, it is typical to run the engines at very low power settings in order to reduce speed and approach the airfield at a relatively steep angle. In the case of STOL—Short Take-Off and Landing—aircraft, it is particularly desirable to reduce the speed and increase the approach angle so that the aircraft can land and be stopped in a short distance. If for some reason the landing maneuver cannot be completed and the aircraft is "waved-off" just prior to landing, full engine thrust is required to quickly and safely gain altitude and speed. Engines operating at very low power setting may be unable, however, to accelerate rapidly enough to provide the required thrust. Therefore, in order to provide the rapid response required, it may be desirable to run the engines at higher power settings and reduce the thrust by means of external thrust vectoring devices which deflect the exhaust products and thus "spoil" the thrust. These spoiler can be retracted rapidly from the exhaust stream to provide needed thrust. In this way, the output thrust is modulated without varying the engine power setting and the total engine output. These thrust vectoring and modulating devices must not produce inbalancing forces on the aircraft which can cause control conditions such as yawing, a rotation of the aircraft about its vertical axis. Furthermore, these devices should be "fail safe"; this means that the spoilers should automatically retract from the exhaust stream in the event of an actuator failure.

It is therefore a primary object of this invention to provide improved thrust vectoring and modulating apparatus for controlling engine thrust independently of the engine power setting.

Another object of this invention is to provide thrust vectoring and modulating apparatus for rapidly varying net output thrust while the engine power output is maintained at a constant level.

Yet another object is to provide improved thrust vectoring apparatus that maintains laterally balanced forces on the aircraft at all times.

A further object is to provide a thrust vectoring device that is inherently fail safe.

A still further object of this invention is to provide improved thrust vectoring and modulating apparatus that are simple in design, easy and relatively inexpensive to manufacture, and reliable in operation.

Briefly stated, in accordance with an illustrated embodiment of the invention, thrust vectoring and modulating means is provided for controlling the net axial thrust produced by a jet propulsion engine. The thrust vectoring means, comprising a plurality of spaced louvers or cascades, is mounted such that it can be moved by suitable actuation means into and out of the stream of exhaust gases issuing from the outlet or nozzle of the engine. Each louver has an airfoil shaped cross section for deflecting the exhaust gases from the normal axial direction, and the louvers are disposed such that the net force exerted on the cascade by the exhaust gases is in a direction to move the cascade out of the stream of gases in the event of failure of the actuation means. The net axial thrust produced by the engine is modulated by the positioning of the cascade, the thrust being reduced with movement of the cascade into the stream and being increased with movement of the cascade out of the stream. Further, in accordance with the illustrated embodiment of the invention, a plurality of engines having the thrust vectoring means are symmetrically disposed about the longitudinal axis of an aircraft. The cascades of louvers are mounted so as to deflect the exhaust gases laterally of the aircraft and are actuated simultaneously and equally to maintain balanced lateral loads on the aircraft.

While the invention is distinctly claimed and particularly pointed out in the claims appended hereto, the invention, both as to organization and content, will be better understood and appreciated, along with other objects and features thereof, from the following detailed description when taken in conjunction with the drawings, in which:

FIG. 1 is a partial plan view of an aircraft having two symmetrically disposed engine nacelles mounted on the aircraft fuselage;

FIG. 2 is a diagram illustrating the relationship between the position of the thrust vectoring means and the net axial thrust produced on the aircraft;

FIG. 3 is a view, partially in section, of one of the nacelles of FIG. 1, the nacelle containing a jet propulsion engine and thrust vectoring and modulating means constructed in accordance with this invention;

FIG. 4 is a fragmentary view similar to FIG. 3 showing the thrust vectoring means positioned to partially intercept and deflect a stream of exhaust gases discharged by the engine;

FIG. 5 is a view similar to FIG. 4 showing the thrust vectoring means positioned to fully intercept and deflect the exhaust gases;

Figure 6:
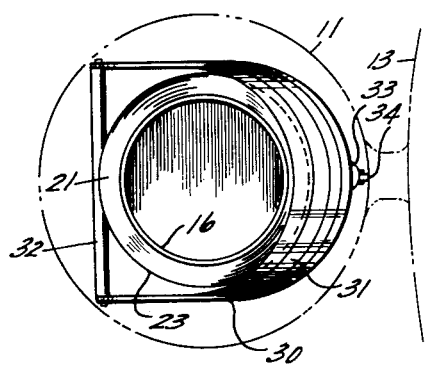
FIG. 6 is a view looking forward from the rear of FIG. 3.
Figure 7:
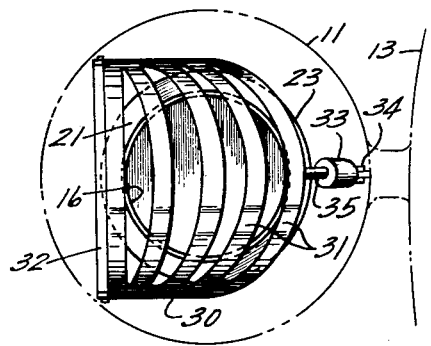
FIG. 7 is a view looking forward from the rear of FIG. 5.

Illustrated by FIG. 1 is an aircraft 10 having a pair of nacelles 11 symmetrically mounted on the aircraft fuselage 13 intermediate the aircraft wings 14 and tail assembly 15. The nacelles 11 are also located aft of the center of gravity, C.G., of the aircraft 10. Each of the nacelles 11 houses a gas turbine engine and has an exhaust opening 16 through which a high velocity stream of combustion products produced by the engine may be directed. These exhaust gases provide propulsive thrust for propelling the aircraft 10. With the engines operating at their normal full power settings, the exhaust gases are normally discharged in an axial direction and produce axial thrust forces F on the aircraft 10 as illustrated by FIG. 1. In accordance with the present invention, thrust vectoring and modulating means (not illustrated by FIG. 1) are provided for selectively deflecting the streams of exhaust gases laterally outwardly of the longitudinal axis of the aircraft and thereby reducing the axial thrust without reducing the total power output of the engines.

Before giving a detailed description of the illustrated embodiment of the thrust vectoring and modulating means, attention is directed to the force vectors shown in FIG. 1. As pointed out above, the normal unvectored thrust produced on the aircraft 10 is represented by axial thrust forces F. If, however, suitable means are used to deflect the exhaust gases outwardly of the fuselage 13 through an angle $\theta$, the thrust forces will also be deflected through the angle angle $\theta$. For example, deflection of the exhaust gases through an angle $\theta_1$ produces thrust forces $F_1$ also acting at an angle $\theta_1$. With the power output of the engines maintained at a constant level, the magnitude of forces $F_1$ is substantially identical to the unvectored forces F, but the axial thrust produced on the aircraft is somewhat reduced since the axial components of the forces $F_1$ are $F_1 \cos \theta_1$. Similarly, a deflection of the exhaust gases through an angle $\theta_2$, produces thrust forces $F_2$ acting at the angle $\theta_2$, and still further reduced net thrust on the aircraft 10. At any angle $\theta$, the lateral thrust component $F_\theta \sin \theta$ are equal and balanced such that there are no unbalanced forces to cause undesirable control conditions such as yawing.

In FIG. 2, the variation of axial thrust with flow deflection angle $\theta$, is illustrated. As discussed in the preceding paragraph, the axial thrust is proportional to the cosine of the angle and, consequently, does not fall off rapidly in magnitude at relatively small flow deflection angles. In view of this, it may be desirable to deflect the streams of exhaust gases through the relatively small angle $\theta_1$ illustrated in FIG. 1 even when substantially full power is required, such as during take-off maneuvers. The reason for this is that since the thrust forces $F_1$ are directed through the center of gravity, C.G., of the aircraft, the individual forces $F_1$ do not exert yaw producing torques on the aircraft. Therefore, if power from one of the engines is lost during takeoff, the thrust produced by the other engine will not compound the difficulties by causing yaw.

In accordance with the present invention, novel thrust vectoring and modulating means is provided for varying the axial thrust as described above and illustrated by FIGS. 1 and 2. FIGS. 3–8 illustrate the novel vectoring arrangement. As shown by FIG. 3, the nacelle 11 houses a gas turbine engine 20 which acts as gas generating means for producing a stream of high velocity exhaust gases, the stream being discharged through an exhaust nozzle or outlet 21 and the nacelle opening 16. Air is supplied to the engine or gas generator 20 through an inlet duct 22.

A cascade 30 of spaced louvers 31 is pivotally mounted adjacent the exhaust outlet 21. The cascade 30 has what is known as a "clamshell" configuration. To provide the desired lateral deflection of the stream of exhaust gases issuing from the outlet 21, the cascade 30 is pivotally mounted on a vertical shaft 32 on the outer side of the exhaust duct 23 carrying the exhaust gases to the outlet 21 from the gas generator 20. As best illustrated by FIGS. 3 and 6, the cascade 30 has a retracted position in which it extends circumferentially around the exhaust duct 23 in radially spaced relation thereto. In other words, the cascade 30 is pivotally mounted on a vertical axis on the side of the duct 23 remote from the longitudinal axis of the aircraft and the cascade extends circumferentially about the side of the duct nearest the longitudinal axis of the aircraft. The louvers 31 of the cascade 30 neither project into the stream of exhaust gases nor communicate therewith and therefore do not deflect the gases when the cascade 30 is in its retracted position.

Referring now to FIGS. 3–5, a hydraulic actuator 33 is pivotally mounted on the nacelle 11 at 34 and has its shaft 35 pivotally connected to the cascade 30 at 36. The pilot operated actuator 33 is used to move the cascade 30 between the retracted position shown by FIG. 3 and the fully immersed position shown by FIG. 5. An intermediate position of the cascade 30 is illustrated by FIG. 4. It will be obvious to those skilled in the art that the intermediate position shown by FIG. 4 is only illustrative; the cascade can be positioned by the pilot in any desired intermediate position between the extreme positions of FIGS. 3 and 5. It will also occur to those skilled in the art that the hydraulic actuator 33 is only illustrative of various devices which can be used for positioning the cascade 30. Various other mechanical, electro-mechanical, pneumatic and hydraulic actuators could be used if desired.

Figure 8:
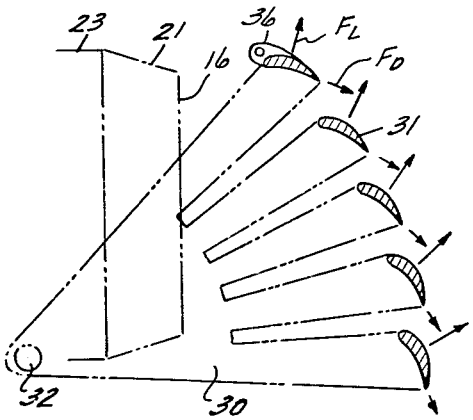
FIG. 8 is an enlarged view of the thrust vectoring means which is positioned as shown by FIG. 5.

Each of the louvers 31 is contoured to deflect the exhaust gases when moved into the stream. As best shown by FIG. 8, the louvers have an airfoil cross section and, in addition, are curved to deflect the gases. Because of the airfoil cross section, the stream of flowing gases produces a lift force, $F_L$, on each louver 31. These lift forces, $F_L$, acting on the cascade 30 are in a direction to move the cascade out of the stream to the retracted position of FIG. 3. The torque produced on the cascade 30 by the lift forces, $F_L$, is more than sufficient to overcome the oppositely directed torque produced by the drag forces, $F_D$, also acting on the cascade.

The operation of the thrust vectoring arrangement will now be described. With the cascades 30 in the retracted position of FIGS. 3 and 6 and the engines 20 operating at full power, axial thrust forces F are exerted on the aircraft 10 when in normal flight. During landing, however, when it is desired to reduce speed without reducing engine power, the cascades 30 are moved into the streams of exhaust gases until a desired axial thrust level is attained. The minimum axial thrust is produced when the cascades are in the fully immersed position illustrated by FIGS. 5 and 7, and the gas streams are deflected through maximum flow deflection angles. Assuming that the maximum possible flow deflection angle is $\theta_2$ of FIG. 1, the axial thrust produced on the aircraft during the landing approach is $2F_2 \cos \theta_2$. If for some reason the landing cannot be completed, the pilot can retract the cascades and immediately re-establish the greater axial thrust forces F.

During aircraft take-off or during other critical operating periods, the pilot may position the cascades to deflect the gas streams through the angle $\theta_1$ and thus minimize any yaw tendencies.

It will occur to those skilled in the art that the thrust vectoring arrangement of this invention is fail safe in that the cascade 30 will automatically move itself out of the gas stream in the event that the hydraulic actuator 33 fails when the cascade is positioned in the stream. This results since the torque produced by the lift forces, $F_L$, is sufficient to overcome the torque produced by the drag forces, $F_D$. Consequently, the pilot will not find himself with inadequate power in the event of an actuator failure.

It is thus seen that the thrust vectoring apparatus of this invention controls axial thrust independently of the engine power setting and maintains balanced lateral loads on the aircraft at all times.

It will be understood that the invention is not limited to the specific details of construction and arrangement of the illustrated embodiment since changes and modifications will be obvious to those skilled in the art. It is therefore intended to cover in the appended claims all such changes and modifications which may occur to those skilled in the art without departing from the true spirit and scope of the invention.

What is claimed as new and is desired to secure by Letters Patent of the United States is:

1. Thrust vectoring and modulating apparatus for aircraft having gas generating means, said apparatus comprising:
   (a) a duct for supplying exhaust gases from the gas generating means to an outlet for producing axial thrust,
   (b) a cascade of spaced louvers mounted for movement through a range of positions, said range of positions having as end positions a retracted position in which said cascade is fully retracted from and out of communication with the stream of exhaust gases issuing from said outlet and an immersed position in which said cascade extends entirely across the stream of exhaust gases issuing from said outlet,
   (c) and actuating means connected to said cascade for positioning said cascade within said range of positions,
   (d) each of said louvers contoured for deflecting the exhaust gases and thereby reducing the axial thrust,
(e) the total amount of thrust reduction being determined by the position of said cascade within said range of positions, the amount of thrust reduction increasing with movement of said cascade toward said immersed position and decreasing with movement toward said retracted positions,
(f) said louvers disposed at all times such that the net force exerted on said cascade by the stream of exhaust gases is sufficient to and is in a direction to move said cascade to said retracted position in the event of failure of said actuating means,
(g) whereby the net axial thrust produced is modulated by varying the position of the cascade within said range and whereby maximum axial thrust is restored in the event of failure of said actuating means.

2. Thrust vectoring and modulating apparatus for aircraft having gas generating means, said apparatus comprising:
(a) a duct for supplying exhaust gases from the gas generating means to an outlet for producing axial thrust,
(b) a cascade of spaced louvers pivotally mounted about a vertical axis for movement through a range of positions, said range of positions having as end positions a retracted position in which said cascade extends circumferentially about said duct in spaced relation thereto upstream of said opening and an immersed position in which said cascade extends entirely across the stream of exhaust gases issuing from said outlet,
(c) and actuating means connected to said cascade for positioning said cascade within said range of positions,
(d) each of said louvers contoured for deflecting the exhaust gases and thereby reducing the axial thrust,
(e) the total amount of thrust reduction being determined by the position of said cascade within said range of positions, the amount of thrust reduction increasing with pivotal movement of said cascade toward said immersed position and decreasing with pivotal movement of said cascade toward said retracted position,
(f) said louvers disposed at all times such that the net force exerted on said cascade by the stream of exhaust gases is sufficient to and is in a direction to move said cascade to said retracted position in the event of failure of said actuating means,
(g) whereby the net axial thrust produced in modulated by varying the position of the cascade within said range and whereby maximum axial thrust is restored in the event of failure of said actuating means.

3. Thrust vectoring and modulating apparatus for aircraft having gas generating means, said apparatus comprising:
(a) at least two ducts symmetrically disposed about the longitudinal axis of the aircraft supplying exhaust gases from the gas generating means to outlets for producing axial thrust,
(b) a cascade of spaced louvers associated with each of said ducts,
(c) each of said cascades pivotally mounted about a vertical axis and on the side of the duct remote from the longitudinal axis of the aircraft for lateral movement through a range of positions, said range of positions having as end positions a retracted position in which the cascade extends circumferentially about the side of the associated duct nearest the longitudinal axis of the aircraft upstream of its outlet and an immersed position in which said cascade extends entirely across the stream of exhaust gases issuing from the outlet,
(d) each of said louvers having an airfoil shaped cross section for deflecting the exhaust gases laterally outwardly of the longitudinal axis of the aircraft and thereby reducing the axial thrust,
(e) the total amount of thrust reduction being determined by the positions of said cascades within the ranges of positions, the amount of thrust reduction increasing with pivotal movement of the cascades toward the immersed positions and decreasing with pivotal movement of the cascades toward the retracted positions,
(f) said louvers disposed such that the net force exerted on each cascade by the associated stream of exhaust gases is in a lateral direction to pivot the cascade about its vertical axis toward the retracted position,
(g) and actuating means connected to said cascades for pivoting said cascades simultaneously and equally to desired positions so as to maintain balanced lateral loads on the aircraft,
(h) whereby the net axial thrust produced is modulated by varying the positions of the cascades.

4. Thrust vectoring and modulating apparatus for aircraft having gas generating means, said apparatus comprising:
(a) at least two ducts symmetrically disposed about the longitudinal axis of the aircraft supplying exhaust gases from the gas generating means to outlets for producing axial thrust,
(b) a cascade of spaced louvers associated with each of said ducts,
(c) each of said cascades pivotally mounted about a vertical axis for lateral movement through a range of positions, said range of positions having as end positions a retracted position in which the cascade extends circumferentially about the associated duct upstream of its outlet and an immersed position in which said cascade extends entirely across the stream of exhaust gases issuing from the outlet,
(d) and actuating means connected to said cascades for pivoting said cascades simultaneously and equally to desired positions so as to maintain balanced lateral loads on the aircraft,
(e) each of the louvers comprising each of said cascades having an airfoil shaped cross section for deflecting the exhaust gases and thereby reducing the axial thrust,
(f) the total amount of thrust reduction being determined by the positions of said cascades within the ranges of positions, the amount of thrust reduction increasing with pivotal movement of the cascades toward the immersed positions and decreasing with pivotal movement of the cascades toward the retracted positions,
(g) said louvers disposed at all times such that the net force exerted on each cascade by the associated stream of exhaust gases is sufficient to and is in a lateral direction to pivot the cascade about its vertical axis to its retracted position in the event of failure of said actuating means,
(h) whereby the net axial thrust produced is modulated by varying the positions of the cascades within said range and whereby maximum axial thrust is restored in the event of failure of said actuating means.

References Cited by the Examiner
UNITED STATES PATENTS

| | | | |
|---|---|---|---|
| 2,738,147 | 3/1956 | Leech | 60—35.54 X |
| 2,758,805 | 8/1956 | Graham | 244—52 |
| 2,932,164 | 4/1960 | Watson | 60—35.54 |
| 3,002,343 | 10/1961 | Baird | 60—35.54 |
| 3,013,751 | 12/1961 | Scott et al. | 244—110 |
| 3,112,616 | 12/1963 | Adamson et al. | 60—35.54 |

FOREIGN PATENTS
739,500  11/1955  Great Britain.

MARK NEWMAN, *Primary Examiner.*
A. L. SMITH, *Assistant Examiner.*